INVENTORS
DALE H. SCHAAL
WALTER J. SCHAAL
MAX N. SCHAAL
BY
ATTORNEYS

Dec. 27, 1966    D. H. SCHAAL ETAL    3,294,177
BEET HARVESTER

Filed Aug. 17, 1964    5 Sheets-Sheet 2

INVENTORS
DALE H. SCHAAL
WALTER J. SCHAAL
BY MAX N. SCHAAL

ATTORNEYS

Dec. 27, 1966  D. H. SCHAAL ETAL  3,294,177
BEET HARVESTER
Filed Aug. 17, 1964  5 Sheets-Sheet 3

INVENTORS
DALE H. SCHAAL
WALTER J. SCHAAL
BY MAX N. SCHAAL

ATTORNEYS

Dec. 27, 1966  D. H. SCHAAL ETAL  3,294,177
BEET HARVESTER
Filed Aug. 17, 1964
5 Sheets-Sheet 4
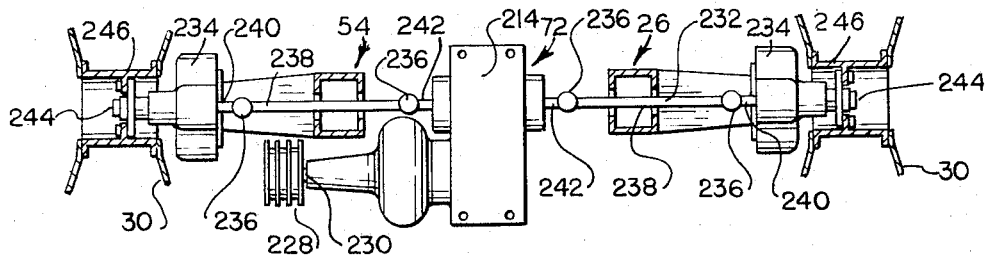
FIG. 8.
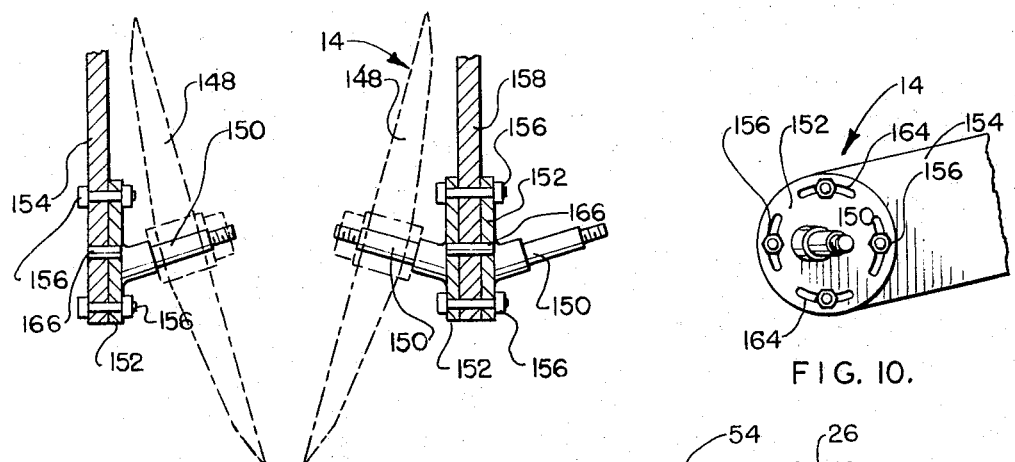
FIG. 9.
FIG. 10.
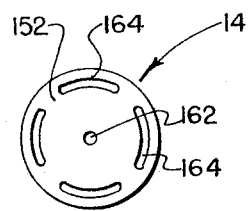
FIG. 11.
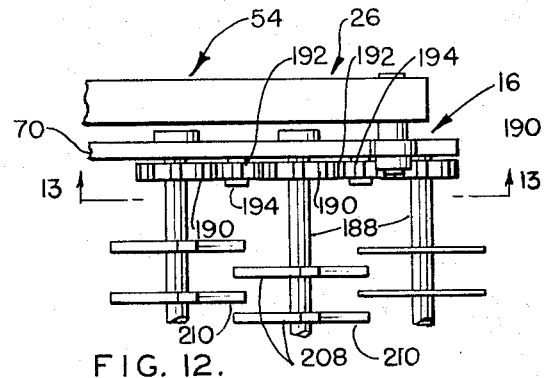
FIG. 12.
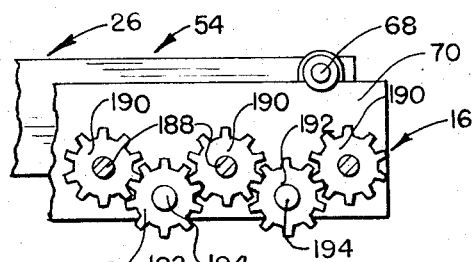
FIG. 13.
INVENTORS
DALE H. SCHAAL
WALTER J. SCHAAL
BY MAX N. SCHAAL
ATTORNEYS

3,294,177
BEET HARVESTER
Dale H. Schaal, Walter J. Schaal, and Max N. Schaal,
all of Rte. 1, Berthoud, Colo. 80513
Filed Aug. 17, 1964, Ser. No. 389,917
19 Claims. (Cl. 171—42)

This invention relates to farm implements and, more specifically, to a beet harvester including means for topping, digging, cleaning and loading beets.

Sugar beets are an extremely significant farm commodity to the Western farmer and considerable acreage is devoted exclusively to beet production. Conventional mechanical planters can be employed to seed sugar beets but harvesting them requires highly specialized equipment that is much more complicated and sophisticated than harvesting implements for other row crops such as corn, wheat, milo, etc. that grow above-ground. Also, more operations need be performed on the beet than other crops to ready same for the refinery. For example, prior to separation of the beet from the ground, it must be "topped" to remove the foliage carried thereby. Next, it is necessary to dig the tuber from the ground leaving it largely intact and without damage. The next step is to remove the soil and other debris that so often cling to the beet as it is taken from the ground. Cleaning the beets is especially important because the sugar refinery buyers downgrade or refuse to accept beets that are caked with mud. The final operation is to deliver the beets to a waiting truck or similar vehicle for transportation to the local refinery storage area or rail spur.

Obviously, these several operations cannot be performed by hand anywhere near as economically as with mechanical harvesting equipment even though "braceros" are commonly hired for this purpose at extremely low labor rates. Manual labor is, however, still used extensively and one reason for this is the deficiencies in the prior art beet harvesting machines to answer the farmer's needs in this area.

Many of the existing harvesters are tractor-drawn units that become extremely difficult to control with the degree of precision required to follow a furrow and dig a carefully planted row crop of this type. There is little margin for error such as one has with an ordinary row crop that grows above ground and which can be moved from side-to-side as required with appropriately-designed guide elements to place the stalk in the path of the flails or similar cutters. With beets, on the other hand, they stay put in the ground and the harvester must be guided directly over them before it becomes possible to carry out the topping and digging operations. A towed harvester cannot possibly be guided as accurately as a self-propelled one where the operator can steer the unit along each row.

A steerable towed harvester provides a partial answer to the above problem, yet, it doubles the labor requirement as one person must operate the tractor while a second steers the harvester. All things considered, a self-propelled unit is by far the best answer to the problem.

Next, since the topping and digging functions are, of necessity, carried out at or below ground level, the harvester must either provide enough clearance underneath to make room for the required topping and digging apparatus or else mount the latter outboard of the wheels. Placing the toppers and diggers behind the unit is unsatisfactory because the operator cannot watch what he is doing. If these elements are located on the side, accurate steering becomes a problem, the entire unit is out-of-balance, and the machine becomes so large and bulky it is difficult to maneuver. Placing the cutters and diggers forward of the front wheels offers some advantages but this is usually not done because of clearance problems underneath which means that the beets must either be lifted overhead for cleaning or directed to one side, either solution being an unsatisfactory compromise for many of the reasons already mentioned. It would seem, therefore, that mounting the topping, digging and cleaning apparatus directly under the frame would offer the best possibilities. The prior art harvesters that use this approach, however, must be built so high off the ground that they become top heavy, unmaneuverable and extremely large. In addition, the units are expensive because unusually large wheels and tires must be used to raise the differential, axles and drive shaft high enough off the ground to receive the functional equipment that must ride directly over the ground.

The digging elements constitute another problem in the prior art machines, particularly the adjustment thereof to suit varying soil conditions. The digger shoes or wheels, both of which are in common use, operate such that a portion at least is below the ground and receives the beet in a wedge-shaped opening that lifts same out of the soil. Less power is required with the wheel-type diggers that roll along the ground with the lower portion under the surface and they are, therefore, preferred to the shoe-type. Both types, however, have a tendency to become clogged with dirt and mud when the soil is wet or to leave an excessive amount of soil on the beet unless provision is made for adjusting the shoes or wheels relative to one another so as to lessen this undesirable condition. With the wheels, this becomes an especially difficult problem as the axles on which they are mounted for rotation are inclined both upwardly and forwardly. Thus, when a change in the width and angle of the wedge-shaped groove defined between the wheels is required, the inclination of the axles with respect to both vertical and horizontal reference planes must be changed.

The prior art beet harvesters commonly exhibit still another deficiency and that is in the design and arrangement of the apparatus that cleans the beets and conveys them to the truck, wagon or other conveyance that is used to transport them to the refinery or storage area. Practically all of the existing machines have substantial portions of the conveyor mechanims overhanging the rear end or sides making the unit unusually large, unstable and difficult to maneuver. With the beet topping and digging elements positioned under the vehicle frame, the prior art tendency has been to have the discharge conveyor trailing out behind or to one side such that it overhangs the wheels a good deal. In so doing, much useable space above the vehicle goes to waste, the drive train becomes quite long and the entire assemblage becomes strung out over a much greater area than necessary.

It has now been found in accordance with the teaching of the instant invention that these and other shortcomings of the prior art beet harvesters can be, in large measure, improved upon or eliminated completely through the use of a unique geometry and rearrangement of components such as to provide a much more compact and serviceable unit. A novel offset drive train to the rear wheels clears the underside of the vehicle and enables the topping, digging and cleaning mechanisms to be located at this point without raising the frame any higher off the ground than other harvesters and farm vehicles. Provision is made for rapidly and accurately adjusting the inclination and spacing of the digger wheels or disks to accommodate varying soil conditions and plating practices.

The elevating conveyor is located in the line of travel of the unit close upon the rear drive wheels and discharges forwardly rather than rearwardly onto a short conveyor that delivers into a hopper placed directly behind the operator. Only the unloading conveyor discharges to the side and even this element is largely located inside the wheeled frame so no condition of imbalance exists.

The operator is seated reasonably close to the ground and directly above the adjacent rows being harvested as he guides the vehicle along them. All operations necessary to top, dig and clean the beets are performed in the direct line of vehicle travel. The over-all close-coupling of the unit reduces the expense, the bulk and unwieldliness of the prior art machines and enables a short efficient drive train to be employed.

It is, therefore, the principal object of the present invention to provide a novel and improved self-propelled beet harvester.

A second objective of the invention herein disclosed is the provision of a more compact and serviceable beet harvester incorporating straight-line flow of the product from topper to hopper.

Another object of the claimed invention is to provide a unit of the type aforementioned in which substantially all functional elements are located within the confines of the wheeled frame.

Still another objective is the provision of a harvester having an overhead front-throw conveyor that makes it possible to store the product in a hopper-type bed positioned immediately behind the operator.

An additional objective is to provide an improved adjustable digger mechanism that will adapt readily to differing soil and pulling conditions to insure a "clean pick" with little damage to the beets and efficient removal of all that have been properly planted.

Further objects are to provide a beet harvesting and topping unit that is relatively inexpensive, easy to operate and service, rugged, efficient, stable, versatile and adaptable to various growing conditions.

Other objects will be in part apparent and in part pointed out specifically hereinafter in connection with the description of the drawings that follows, and in which:

FIGURE 8 is a horizontal section taken along line 8—8 of FIGURE 2 showing details of the offset drive mechanism, portions having been broken away to conserve space;

FIGURE 9 is an enlarged sectional detail of the adjustable digger wheel supports;

FIGURE 10 is a side elevation of the adjustable support of FIGURE 9;

FIGURE 11 is a side elevation similar to FIGURE 10 except that it shows only the slotted adjusting plate with the bolts and stub shaft removed therefrom;

FIGURE 12 is a fragmentary top plan view of the beet-cleaning star wheels and geared drive therefor;

FIGURE 13 is a section taken along line 13—13 of FIGURE 12; and,

Figure 1:
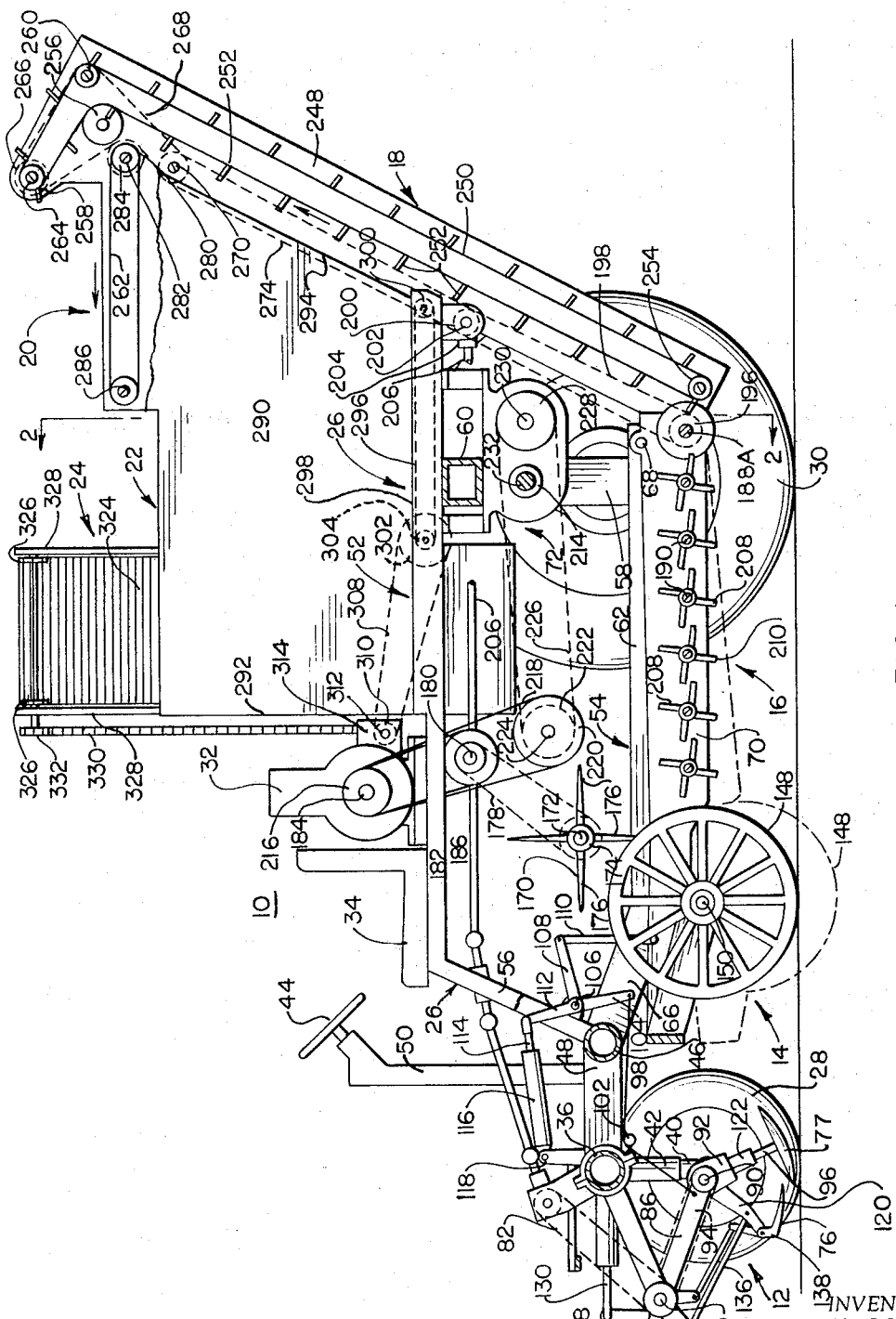
FIGURE 1 is a side elevation of the beet harvester of the present invention, portions having been broken away and shown in section to better reveal the internal workings.

Referring now to the drawings for a detailed description of the present invention and, initially, to FIGURE 1 for this purpose, reference numeral 10 represents the harvester in its entirety which includes as subassemblies a topper mechanism 12, a digger mechanism 14, a cleaning assembly 16, an elevating conveyor 18, a hopper feed conveyor 20, a hopper 22 and a discharge conveyor 24. The harvester 10 is a self-propelled vehicle having a frame indicated in a general way by numeral 26 supported at its forward end on steerable wheels 28 and at the rear end on tandem drive wheels 30. The power for moving the harvester over the ground as well as operating its various functional subassemblies is derived from a single prime mover 32 of the internal combustion type. With the exception of the discharge conveyor 24, all of the functional subassemblies 12, 14, 16 and 18 and 20 are positioned on the fore-aft centerline of the unit immediately beneath or directly behind the operator who occupies seat 34 atop the frame and just forward of the prime mover and hopper 22.

Frame 26 is best revealed in FIGURES 1–4, inclusive, to which reference will now be made. Across the front end of the frame extends a transverse tubular member 36 which carries the steerable wheels 28 on the extremities thereof. Members 36 forms the front axel and is pivoted on pedestal 48 to permit the front wheels to follow uneven ground. These wheels are mounted on the ends of stub shafts 38 (FIGURE 4) for rotational movement. The stub shafts 38 are, in turn, fastened to the lower ends of vertically extending king pins 40 that are mounted for rotation in vertical sleeves 42 (FIGURE 1) attached to the ends of tube 36. The upper ends of the king pins are provided with steering knuckles 42 that extend forwardly therefrom and are operatively interconnected to one another and to the steering wheel 44 by a conventional tie rod and steering mechanism that has not been illustrated as it forms no part of the present invention.

A second tubular member 46 is spaced rearwardly of first tubular member 36 in parallel relation thereto and longitudinal element 48 (FIGURES 1 and 3) interconnects same providing a substantially horizontal support for the steering column 50 as well as a support for the operator's feet. Rearwardly of second tubular element 46 the frame 26 is separated into upper and lower subframes that have been broadly designated by reference numerals 52 and 54, respectively.

Upwardly and rearwardly inclined elements 56 support the front end of upper subframe 52 above second tubular element 46 to which they are connected. The rear ends of the upper and lower subframes 52 and 54 are interconnected by rear transverse member 58 that includes an upwardly offset central portion 60 upon which the upper subframe 52 rests while the spaced longitudinal members 62 of the lower subframe 54 are fastened underneath said transverse member as clearly shown in FIGURE 2. The upper subframe 52 supports the operator's seat 34, prime mover 32 and hopper 22 along with various other elements which will be described in detail presently. The specific details of lower subframe 54 are best revealed in FIGURE 3 where it will be seen to include longitudinal elements 62 interconnected at their forward extremities by the transverse tubular element 46 with a portion of the forward extremities of elements 62 being upwardly inclined as at 66.

Mounted for pivotal movement about a horizontal transverse axis defined by pins 68 at the rear end of lower subframe 54 is a movable bed frame 70 that carries the digger assembly 14 and the cleaning mechanism 16. The inverted U-shaped offset 60 in rear transverse element 58 opens over the cleaning mechanism 16 and cooperates with the upwardly offset rear wheel drive mechanism that has been broadly designated by numeral 72 to leave an unobstructed passageway 74 between the upper and lower subframes for movement of the product.

Next, with reference to FIGURES 1, 4, 5, 6 and 7, the topping assembly 12 will be described in detail. Essentially, this assembly comprises a transversely-shaped pair of shoes 76 that run along the beet rows and ride up on top of each beet thereby positioning a rotating concave notch-edged disk 77 located therebehind which functions to cut off the top foliage of the beet prior to the tuberous portion thereof being dug from the ground. The above elements are interconnected by a complex linkage of arms and levers that drop same into operative position and allow the shoes to move up and down as the ground contour demands while, at the same time, maintaining the operative relationship between said shoes and cut-off disks.

Projecting downwrdly and forwardly in spaced parallel relation from the first transverse tubular element 36 of the frame are a pair of stout supporting arms 78 which journal a live shaft 80 therebetween ahead of member 36 parallel thereto. A chain and sprocket drive 82 connects this live shaft to a right angle gear box 84 mounted on member 36, the gear box being operatively connected to the prime mover through a series of drive shafts, universal couplings and another gear box that will be described in greater detail in connection with FIGURES 1 and 14.

Inwardly of supporting arms 78 are located pivoted struts 86 and 88, a set for each topping disk 77. The forward extremities of these struts are journalled on live shaft 80 for pivotal movement thereon while the latter is turning and the rear strut ends are similarly connected to opposite ends of stub shaft 90 that emerge from opposite sides of right angled gear drive 92. A chain and sprocket drive 94 operatively connects each of these stub shafts 90 to live shaft 80 and functions to rotate shafts 96 that emerge from the underside of right-angled drives 92 carrying the concave topping disks 77 on the lower ends thereof. Thus, strut 86 and 88 pivotally support the topping disks and cooperate with arms 78 to provide a "knee-type" joint by which the disks can be raised or lowered. The latter function is accomplished by means of a flexible cable 98 attached to a pin 100 on struts 86 that passes over a roller 102 secured to the forward end of the frame and thence to one end of a bell crank 104. This bell crank 104 is mounted on the frame for pivotal movement with a transverse shaft 106 (FIGURE 1) carried by the frame and rotatable relative thereto. The other leg 108 of bell crank 104 is attached to the movable bed frame 70 of the cleaning assembly 16 by a link 110. Also mounted on shaft 106 is a lever 112 that is, in turn, connected to the piston rod 114 of an actuating hydraulic servomotor 116 pivotally attached to the frame at 118. An examination of FIGURE 1 will reveal that extension of piston rod 114 will swing the lever 112 rearwardly rotating bell cranks 104 clockwise and simultaneously lowering the bed frame 70 into its dotted line operative position and topping disks 77 onto the ground. Conversely, actuation of the servo-motor to retract the piston will raise both the bed frame and disks into their inoperative positions.

The finder shoes 76 are pivotally mounted on forwardly projecting arms 120 fastened to the housing 122 of right-angled gear drive 92. Thus, operation of servo-motor 116 also functions to raise and lower the finder shoes by actuation the previously-described "knee-joint." In addition, however, it is necessary to provide linkage interconnecting the finder shoes and topping disks which is operative to position the topping disks so as to cut only the foliage from the beets once the shoes have located it.

Specifically, live shaft 80 has mounted thereon a pair of bell cranks 124 that are interconnected at the free ends of one leg by a transverse bar 126 which lies spaced forwardly of shaft 80 in spaced parallel relation thereto. Shaft 80 provides the fulcrum about which the bell cranks 124 pivot at their apex, the shaft being freely rotatable therein. Bar 126 is fixed to the legs of the crank and includes an upstanding crank arm 128 the free end of which is pivotally connected to piston rod 130 of second hydraulic servo-motor 132. The cylinder 132 of the servo-motor is pivotally mounted on the frame as can best be seen in FIGURE 4.

The forward extremities of arms 78 have inturned end portions 134 that terminate in substantially longitudinal alignment with the finder shoes 76. Rigid T-shaped links 136 interconnect inwardly offset arm end portions 134 with the bifurcated shoe supports 120 that project from the gear housing 122. Upturned ears 138 on the forward ends of shoes 76 are pivotally attached to the forward ends of bifurcated element 120. One of said upturned ears 138a is longer than the other (FIGURES 5 and 6), said longer ear being pivotally connected to the other leg 140 of dog leg crank 124 by rigid link 142.

Figures 4, 5, 6, 7:
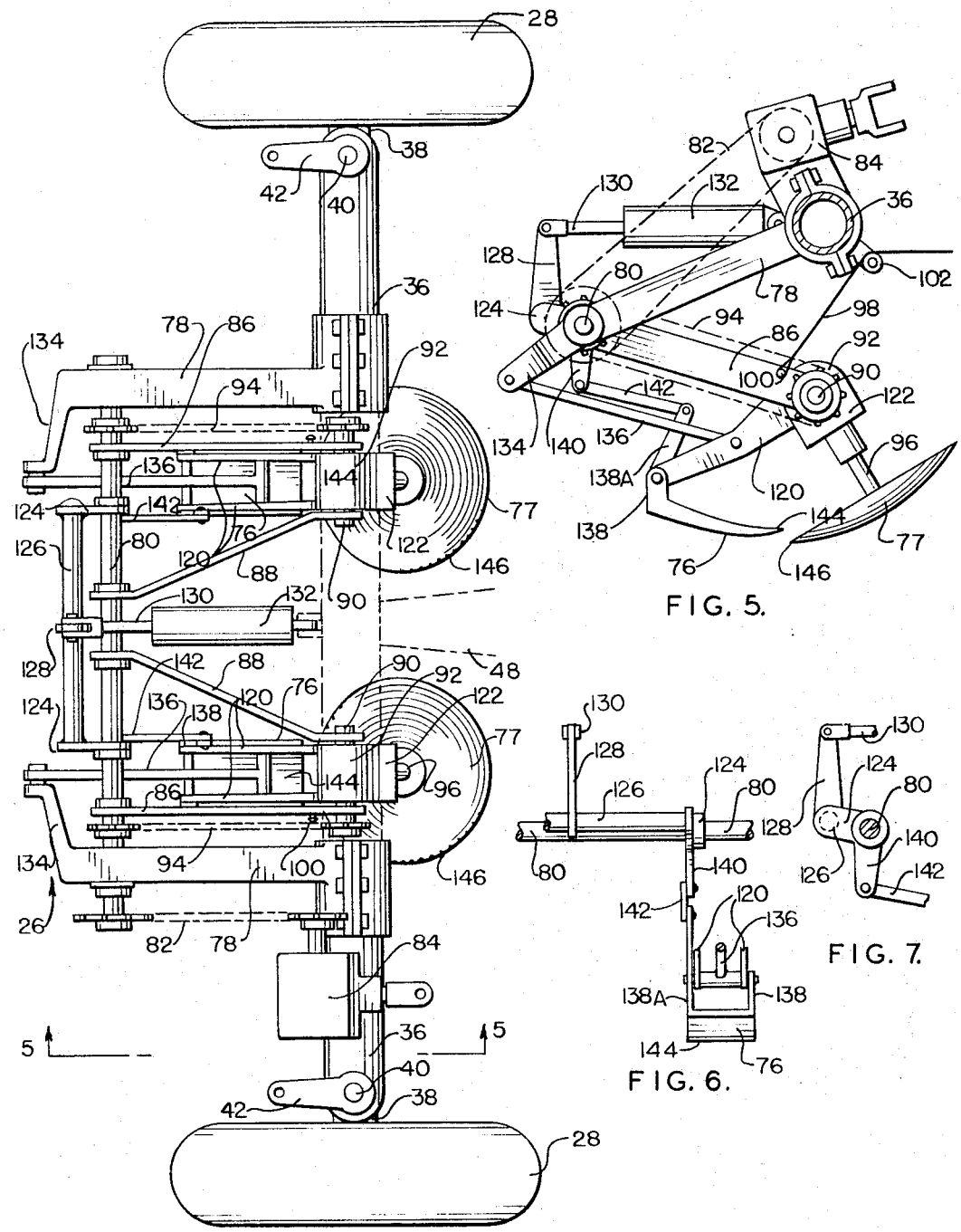
FIGURE 4 is an enlarged fragmentary top plan view of the steerable wheels and topper assembly.
FIGURE 5 is a section taken along line 5—5 of FIGURE 4.
FIGURE 6 is a fragmentary front elevational detail of the finder shoe and associated linkage that forms a part of the topper mechanism.
FIGURE 7 is a side elevation of the linkage shown in FIGURE 6.

Now 136 is pivotally attached to bifurcated arm 120 intermediate the ends thereof, i.e. behind the point at which the shoe is attached, and it generally parallels member 86 while having approximately the same effective length. The net result is that stub shaft 90, live shaft 80 and the pivotal connections of T-shaped link 132 cooperate to define the corners of a parallelogram connection as can be clearly seen in FIGURE 5 which functions to maintain shaft 96 and the topping disk 77 attached thereto at the same inclination irrespective of how high or low it may be. In other words, disk 77 must have about the inclination shown in FIGURE 5 to effectively top the beets but it must move up and down some to accommodate variations in the ground along the row being harvested. The element that raises and lowers the disk 77 to the proper height necessary to top the beets is shoe 76 which rides along the ground ahead of said disk. Servo-motor 132, crank arm 128, bell crank 124, link 142 and elongated ear 138a do nothing more than adjust the rear bladed edge 144 of shoe 76 relative to the saw toothed edge 146 of disk 77. With the shoe positioned relative to the disk as shown in FIGURE 5, the disk would probably cut off the beet foliage right at the base thereof because the shoe would fold the foliage down ahead of it and lift the entire assembly up enough to not cut into the tuberous part more than a fraction of an inch. This depth of cut can, of course, be varied with servo-motor 132. Note also, that once the shoe has been set relative to the disk, said shoe will operate the parallelogram connection and raise or lower the entire assembly as it slides along the ground. Cable 98, on the other hand elevates the whoe assembly into inoperative position.

Figure 3:
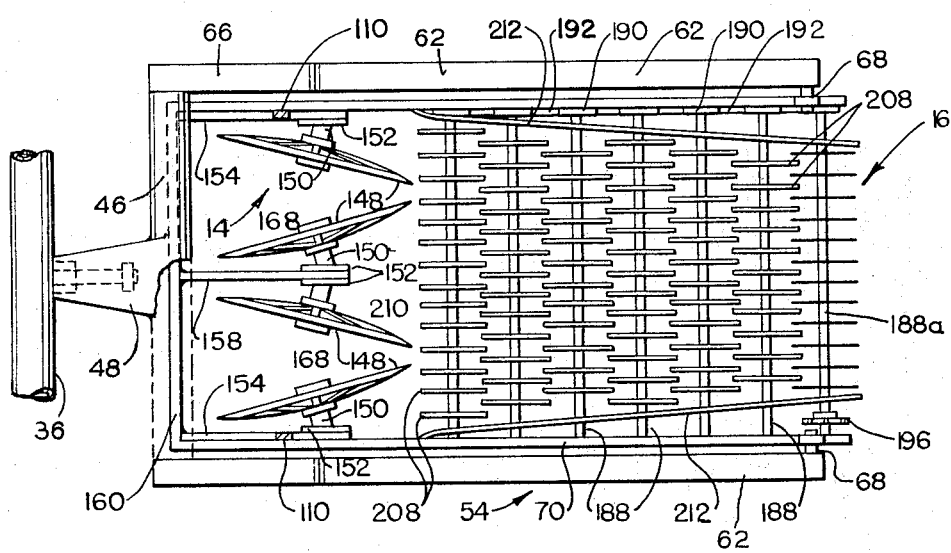
FIGURE 3 is a fragmentary top plan view of the digging and cleaning mechanisms.

Next, specific reference will be made to FIGURES 1, 3, 9, 10 and 11 for details of the digger assembly 14. The aforementioned apparatus is carried by the forward end of hinged frame 70 as indicated in FIGURE 3 and comprises four identical concave spoked disks 148 mounted for rotation on forwardly and upwardly inclined axles 150 that are eccentrically mounted on rotarially adjustable plates 152. In the particular form shown, the sides of hinged frame 70 are reinforced by plates 154 to which the outboard adjustable plates 152 are secured by bolts 156 for limited rotational movement. The inboard adjustable plates 152 are, on the other hand, secured in back-to-back relation to a rearwardly-extending divider 158 (FIGURE 3) that is spaced midway between the sides of frame 70 and is attached at its forward extremity to front transverse element 160 thereof. Only one set of bolts 156 is necessary to attach the inboard plates 152 to divider 158 as shown in FIGURE 9.

Disks 152, as best seen in FIGURE 11, have a center-hole 162 bordered by arcuate slots 164 on the periphery that receive the bolts 156. Thus, each disk can be rotated through an angle somewhat less than 90° about its axis defined by aligning pin 166. Now, the point at which the axle 150 is attached to plate 152 is displaced radially from the center although the axis of the axle intersects and is, therefore coplanar with the axis of rotational adjustment of the disk.

The upward inclination of the axles 150, of course, places the lower peripheral edges of the wheels 148 in closer proximity to one another than their upper edges. The forward inclination of the axles, on the other hand, places the rear wheel edges closer than the front edges. The resulting combination is such that the lower edges of each pair of adjacent digger wheels defines a front-opening generally wedge-shaped entry that decreases in width from front-to-rear but non-linearly due to the convex curved sides of said entry. An examination of FIGURES 3 and 9 will reveal that by maintaining all four axles at the same inclination, the thing that happens when the plates 152 are rotated is to move the point of closest approach of the disks around. In FIGURE 3, for example, the axes of the axles are essentially horizontal meaning they have only a forward inclination and no upward inclination thus placing the point of closest approach of the disks directly to the rear in a horizontal plane containing the shaft axes. The resultant wedge-shaped entry 168 is, in this particular condition, truly wedge-shaped looking down from above as shown. Now, as the disks are rotated to lower the point of closest approach, the sides of the wedge-shaped opening becomed curved, more steeply inclined relative to one another and the depth of the wedge-shaped opening from front to rear is less. Conversely, the condition of the disks in FIGURE 9 is such that the point of closest disk approach is at the bottom or nadir and the axles have no forward inclination, but rather, lie in a vertical plane.

In operation, the hinged frame is lowered into the dotted line position of FIGURE 1 where the bottom edges of the digger wheels go underground and roll along as the vehicle travels forwardly. As the operative pairs of digger wheels move along adjacent beet rows, the beets move into the generally wedge-shaped entry 168, are engaged by said wheels and lifted from the ground as said wheels turn. The beets being stationary become successively more tightly wedged between the wheels until they are lifted free.

The aforementioned adjustment of the digger wheels permits the shape of the wedge-shaped entry 168 to be varied over wide limits to accommodate varying soil conditions, product size and other variables. It should be noted that the digger wheels are not powered, but rather, rotate frictionally as they travel along underground.

Finally, before proceeding with a description of the cleaning mechanism, a word should be said about the adjustment limits. The FIGURE 3 adjustment is a practical one and it would even be possible to further elevate the point of closest approach of the disks beyond the location in FIGURE 3 and still have the wheels 148 release the beets in time for kicker 170 (FIGURE 1) to knock them back on to the cleaning table 16. On the other hand, if the point of closest approach is too high, the wheels will not release the beets until they go too far up and forward resulting in either a damaged product or a broken kicker.

Conversely, if the point of closest approach of the digger wheels is at the bottom as in FIGURE 9, the wheels will begin to release the beets as soon as they pass under the axles 150 and this may result in the beets not being separated from the ground or, more likely, being released by the wheels before they can be carried high enough to be engaged by the kicker. Accordingly, the maximum practical limits of adjustment are approximately that of FIGURE 3 and where the point of closest approach is behind that of FIGURE 9.

Figure 14:
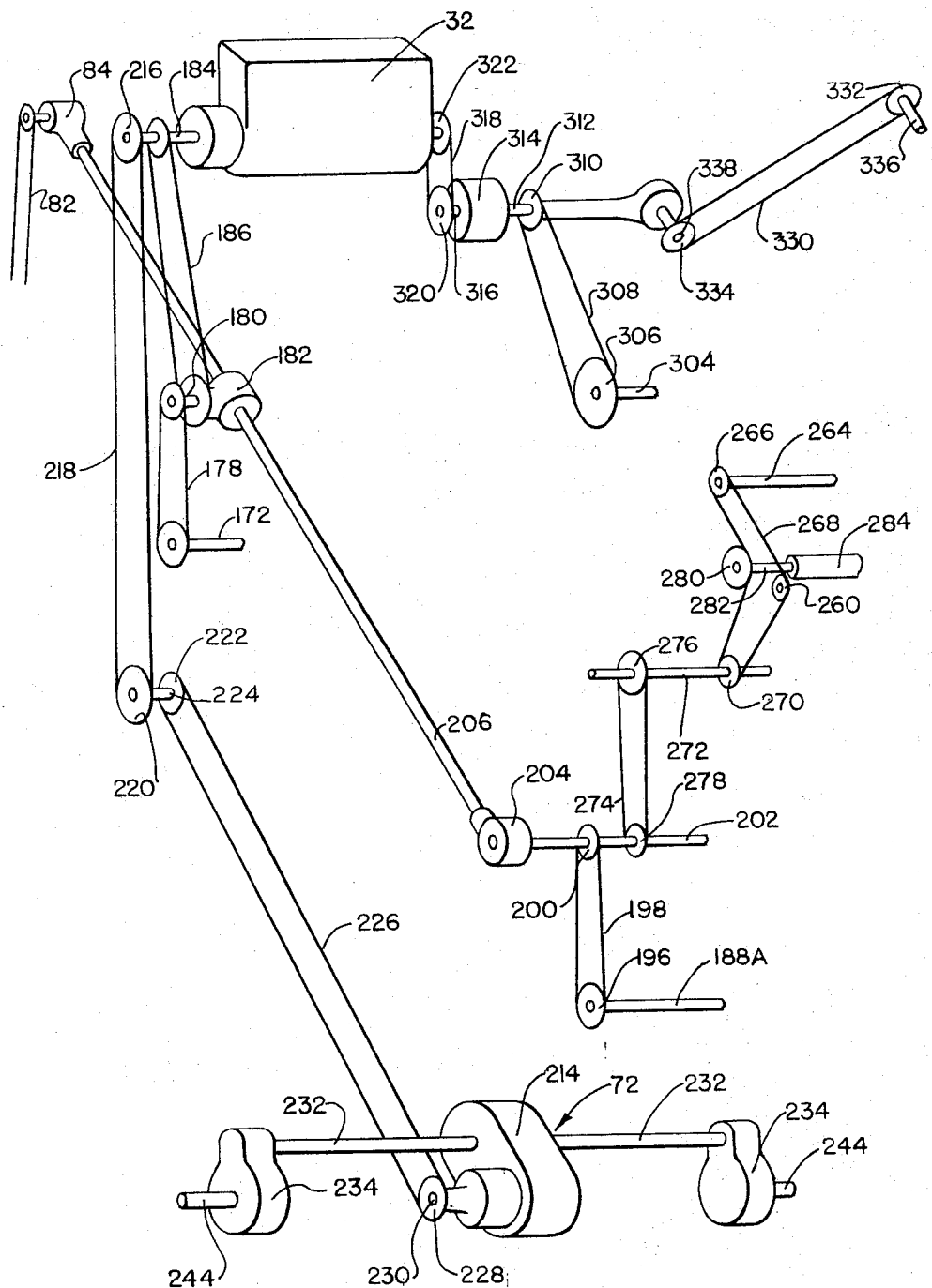
FIGURE 14 is a schematic of the drive train operatively interconnecting the several subassemblies.

In FIGURES 1 and 14, it will be noted that a transverse shaft 172 is mounted for rotation above and slightly behind the digger wheels 148. On this shaft are mounted a pair of kicker elements 170 each comprising a hub 174 having a plurality of radial blades or paddles 176 emanating therefrom (FIGURE 1). As shown in FIGURE 1, these blades pass into the spaces between each pair of digger wheels and, when rotated counterclockwise, function to "kick" the beets from between these wheels rearwardly onto cleaning table 16.

Rotation of these paddle wheels 170 is accomplished by means of a belt-and-pulley power transfer mechanism 178 operatively interconnecting the input shaft 180 of right angle drive 182 and shaft 172. Shaft 180 is, in turn, driven from the main motor shaft 184 by means of a second belt-and-pulley power transfer mechanism 186.

Continuing to examine functional subassemblies of the harvester in the order of their use, reference will now be made to FIGURES 1, 2, 3, 12 and 13 where the cleaning tray 16 has been shown. This cleaning apparatus is disposed in approximately the rear two-thirds of hinged frame 70 directly behind the digger wheels 148 and in position to receive the beets knocked from therebetween by kicker 174.

Specifically, this cleaning tray includes a plurality of transverse shafts 188 journalled for rotation in spaced parallel relation between the sides of the hinged frame 70. On the same end of each shaft is a gear 190, adjacent pairs of which mesh with a reversing gear 192 located therebetween and journalled on a stub shaft 194. The rearmost shaft 188a also carries a sprocket 196 on its opposite end that is operatively connected to the engine 32 through chain 198, sprocket 200, shaft 202, right-angled gear box 204 and shaft 206 which is one of the output shafts of gear box 182 previously described in the power train to kicker 174. Shaft 188a turns clockwise as viewed in FIGURE 1 driving all of the shafts 188 in the same direction due to reversing gears 192.

Each shaft 188 carries mounted thereon a plurality of starwheels 208 arranged in side-by-side parallel relation. These starwheels are staggered from one shaft to the next and their tines or spokes 210 are long enough to slightly overlap one another as can best be seen in FIGURES 3 and 12. As these wheels rotate, the tines knock the encrusted mud and dirt from the beets which drops between them and falls back to the ground. Meanwhile, the beets are being conveyed toward the rear and up a slight incline due to the depressed forward end of the hinged frame 70 (dotted lines in FIGURE 1). In addition, a pair of deflector plates 212 overlie the tray 16 and function to guide the beets toward the center before being picked up by elevator 18. It is at this point that the beets must pass beneath the drive to the rear wheels. Ordinarily, to provide enough clearance for this operation and the equipment performing same, extremely large diameter wheels would have to be used in order that the differential clear the ground by a sufficient margin. The instant invention, however, overcomes this difficulty and enables ordinary sized wheels to be used by means of an offset rear wheels drive mechanism 72 to which reference will now be made in connection with FIGURES 1, 2, 8 and 14.

Unit 214, fastened to the underside of upwardly offset transverse frame element 60, functions to transfer power from engine 32 to dual drive wheels 30 by means of a drive train that includes a single-groove pulley 216 mounted on output shaft 184, drive belt 218, a second single-groove pulley 220 and a multiple-groove pulley 222 fastened to idler shaft 224, drive belts 226, a second multiple-groove pulley 228 on gear unit input shaft 230, jointed output shafts 232 and gear reduces 234 mounted on the ends of frame element 58. Unit 214 also performs several other functions which, while important, will not be described in detail because they are common in rear drive wheel driving connections and are, therefore, old in the art. For instance, unit 214 is a commercially-available transmission that includes clutch and brake mechanisms in conjunction therewith that brake and disengage the drive train to either set of wheels while the other remains engaged to turn a corner. Other devices which are capable of transmitting power to the drive wheels while performing the function of a differential could, of course, be used in place of unit 214 provided they can be offset upwardly to clear the space above the cleaning tray and enable small diameter drive wheels to be used. The latter is one of the most significant improvements brought about by the instant design and is accomplished by elevating the gear unit 214 well above the axis of rotation of the wheels. Then, the operative connection between gear unit 214 and the wheels utilizes jointed shafts 232 that have universal couplings 236 joining intermediate drive shaft section 238 to the input shaft 240 of the reducer and to the output shaft 242 of the gear unit, the latter shafts being parallel but offset. Even the gear reducers 234 are located such that their input shafts 240 lie well above their output shafts 244 that are fastened to the hubs 246 of wheels 30.

After the topped, dug and cleaned beets leave the cleaning tray, it is necessary to elevate them into position for entry into hopper 22 that rests on the upper deck of the frame immediately behind the engine. For this purpose an elevator 18 is employed that will be discussed in connection with FIGURES 1 and 14. The side frame elements 248 of the elevator are fastened to the rear of the hopper and inside the upstanding legs of offset main frame element 58 (FIGURE 2) which places the elevator entry adjacent the discharge of cleaning tray 70. An endless chain belt 250 having spaced parallel portions 252 upstanding therefrom is reeved around lower idler sprockets 254 upwardly and rearwardly over idler sprockets 256, thence forwardly around sprockets 258, back to sprockets 260 and finally down again to sprockets 254. All of the above-described sprockets are mounted for rotation on shafts extending between the side frame elements 248 of the elevator. The chain belt meshes at its edges with the sprocket teeth which drive same and prevent it from slipping. The partitions 252 pass between sprockets 256 at the top of the elevator. As the belt passes over sprockets 256, the beets that have been held and elevated by the partitions are released therefrom and dropped onto horizontal moving belt 262 that carries them forward until they drop off the end into the hopper.

Power is supplied to the elevator through shaft 264 that carries the belt sprockets 258. In addition, this shaft carries a pulley 266 driven by belt 268 that takes power from pulley 270 on shaft 272 which is, in turn, driven from shaft 202 previously described with belt 274 interconnecting shafts 202 and 272 by means of pulleys 276 and 278 as shown in FIGURE 14. Shaft 202 is the one emerging from right angled gear box 204 that drives the star wheels of the cleaning tray. The rear segment of belt 268 passes over pulley 260 located between pulleys 266 and 270; whereas, the forward segment of belt 268 passes across pulley 280 that drives shaft 282 and endless belt 262 reeved around rollers 284 and 286. Thus, as the beets are carried to the top of the elevator 18 and over sprockets 256, they drop free of the upstanding retainers 252 and drop down onto belt 262 that carries them forward to the point where they drop off into the hopper 22.

As has been previously mentioned, one of the important features of this elevator-conveyor assembly 18 and 20 is its extremely compact nature. Instead of delivering the beets to the side or rear as is often the case in the prior art machines, they are returned forwardly to the hopper positioned directly behind the operator and over the drive wheels. The beets always move in a straight line until they are finally taken from the hopper and this straight line is substantially coincident with the centerline of vehicle travel. No condition of imbalance exists, the drive trains to the various operative elements are fairly short and all operations are carried out in close proximity to the operator where he can watch them.

Figure 2:
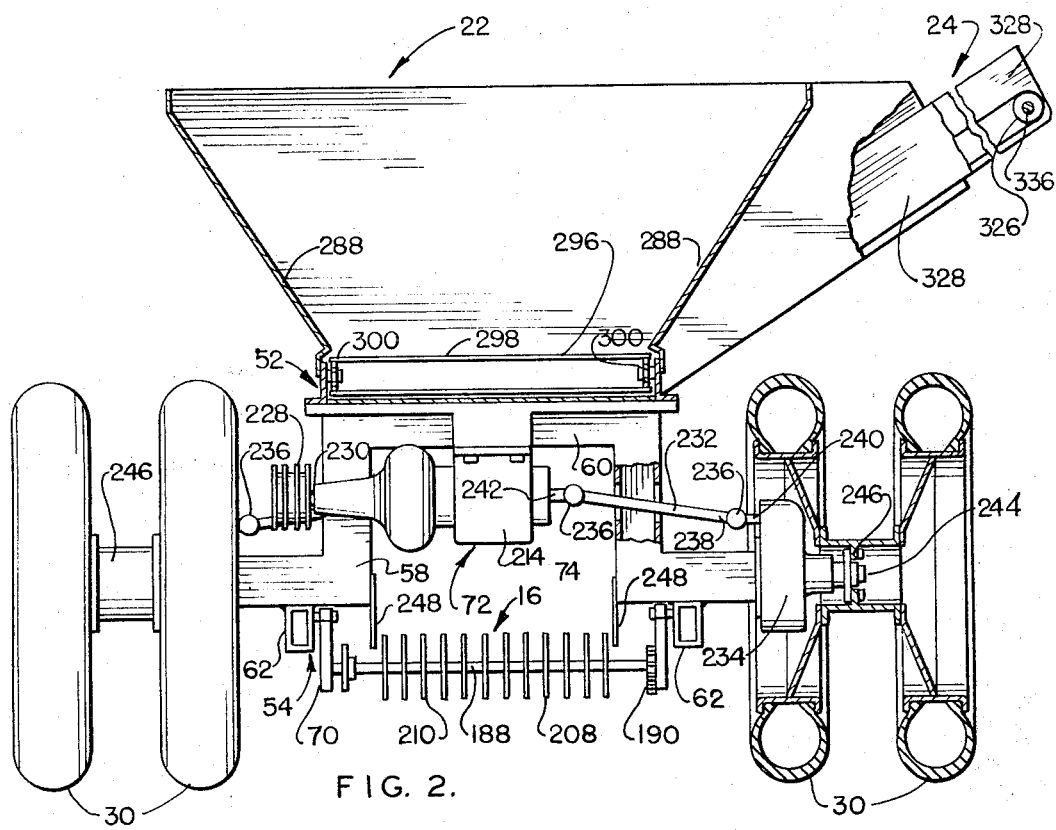
FIGURE 2 is a vertical section taken along line 2—2 of FIGURE 1 with portions, once again, broken away to show the interior.

Hopper 22 can be seen in FIGURES 1 and 2 to have divergent sidewalls 288 and 290, a substantially vertical front wall 292 and an upwardly and rearwardly inclined rear wall 294. This hopper rests upon and is supported by the upper deck of the main frame. Approximately the rear half of the hopper is covered by horizontal conveyor 20 which delivers the beets onto a second horizontal conveyor 296 located in the bottom of the hopper. The latter conveyor extends from side-to-side in the hopper bottom and has an endless belt 298 reeved around idlers 300 and similar belt driving elements 302 at the front end thereof. Belt driving elements 302 are mounted on a shaft 304 (FIGURE 15) having a pulley 306 thereon over which belt 308 is reeved that operatively connects a second pulley 310 on the output shaft 312 of gear box 314. The input shaft 316 of gear box 314 is, in turn, operatively connected to the main engine 32 by belt 318 and pulley 320 and 322.

The final step in the harvesting operation performed by the present invention is the ejection of the beets from the hopper laterally into a truck or wagon being driven alongside thereof. Horizontal conveyor 296 in the bottom of the hopper terminates at the rear edge of discharge conveyor 24 onto which it delivers the beets that have been loaded into the hopper. Conveyor 24 covers the remainder of the bottom of the hopper and extends from the front edge of conveyor 296 to front wall 292.

An endless belt 324 is reeved around belt drive elements 326 mounted between side plates 328 that extend upwardly and to the right as viewed from the rear in FIGURE 2. This conveyor is chain driven by chain 330 connecting upper sprocket 332 and lower sprocket 334. Sprocket 332 is mounted on shaft 336 that carries the upper set of belt drive elements 326. Sprocket 334, on the other hand, is fastened to output shaft 338 of right-angled drive 340, the input to which is shaft 312.

Having thus described the several useful and novel features of the beet harvester of the present invention, it will be apparent that the many worthwhile objectives for which it was designed have been achieved. Although but a single specific embodiment of the invention has been illustrated and described, we realize that certain changes and modifications therein may well occur to those skilled in the art within the broad teaching hereof; hence, it is our intention that the scope of protection afforded hereby shall be limited only insofar as said limitations are expressly set forth in the appended claims.

What is claimed is:

1. The self-propelled sugar beet harvester which comprises: a frame having at least two substantially horizontal decks superimposed one above the other, the lower of said decks having an open area therein, uprights interconnecting the upper and lower decks at the rear corners thereof so as to leave a relatively unobstructed passage extending readwardly off the lower deck; a pair of steerable wheels mounted on the front of the frame; a prime mover carried on the frame in position to leave the space between the decks unobstructed; a pair of drive wheels journalled for rotation on the rear outboard extremities of the lower deck; a drive train operatively interconnecting the drive wheels and prime mover so as to leave the space between the decks relatively unobstructed, said train including a transmission suspended from the underside of the upper deck in upwardly offset relation to the axis of rotation of the drive wheels and offset means forming a driving connection between said transmission and each drive wheel, said offset means connecting into the drive wheels at points spaced above the axis of rotation thereof so as to leave the space between the upper and lower decks relatively unobstructed; beet topping means carried by the frame between the steerable wheels adapted to sever the foliage therefrom upon movement into contact therewith; a hinged frame mounted within the open area of the lower deck for pivotal movement about a transverse axis located at the rear extremity thereof; beet digging means carried in the forward end of the hinged frame directly behind the beet-topping means, said digging means including elements defining a wedge-shaped opening therebetween adapted to releasably grasp a beet upon forward movement into engagement therewith, and said wedge-forming elements being operative to enter the ground and raise a beet to the surface that enters the wedge-shaped opening when the hinged frame is lowered; beet-releasing means mounted between the upper and lower decks in operative relation to the beet-digging means, said releasing means including ejector elements positioned to engage a beet wedged between the digger elements after the latter have freed the beet from the soil, and said ejector elements being operative upon actuation to remove the beet from the wedge-shaped opening in the digger elements allowing said beet to drop free onto the hinged frame; beet cleaning and conveying means mounted on the hinged frame behind the beet-digging means and in position to receive beets ejected therefrom by the beet-releasing means, said cleaning and conveying means including a plurality of transversely-extending elements rotatable in the same direction about longitudinally-spaced parallel axis, said transverse elements being adapted to tumble the beet falling thereon while carrying same to the rear of the hinged frame; an open-topped hopper mounted on the upper deck directly over the hinged frame; elevator means located at the rear of the lower deck in position to receive beets issuing from the cleaning and conveyong means, said elevator means being adapted to carry the beets upwardly behind the hopper to a height substantially on a level with the open top thereof; and, conveyor means adapted to receive beets from the conveyor means and deliver same forwardly into the hopper.

2. The beet harvester as set forth in claim 1 in which: the frame includes a third deck located ahead of the upper and lower decks projecting forwardly from an intermediate position therebetween, said third deck providing the portion of the frame supporting the beet-topping means and carrying the steerable wheels.

3. The beet harvester as set forth in claim 1 in which: the elements of the beet-digging means that define the wedge-shaped opening therebetween comprise a pair of spoked wheels having opposed concave faces mounted for rotational movement about downwardly and forwardly inclined axes.

4. The beet harvester as set forth in claim 3 in which: the downwardly and forwardly inclined axes of rotation of the digger wheels comprise a pair of stub shafts mounted eccentrically on adjustable plates fastened to the frame for limited rotational movement, said stub shafts being inclined relative to the supporting plates therefor so as to intersect the axis of rotational movement of the latter, said shafts normally being positioned in opposed oppositely-inclined co-planar relation in all adjusted positions thereof; and the limits of adjustment of the axes of wheel rotation being such as to vary the point of closest approach of the peripheral edges thereof from beneath the stub shafts to a position displaced arcuately therebehind.

5. The beet harvester as set forth in claim 1 in which: the beet-topping means includes a saw-tooth-edged disked disk carried by the frame for vertical adjustment relative thereto and journalled for rotation about an upwardly and forwardly-inclined axis; power transfer means operatively connecting said disk to the prime mover, and means moving over the ground ahead of the disk operatively linked thereto so as to adjust the height of said disk in response to variations in ground contour.

6. The beet harvester as set forth in claim 5 in which: the linkage interconnecting the beet-topping disks and the means operatively connected thereto for accommodating contour variations in the ground comprises a downwardly and rearwardly inclined parallelogram linkage, said contour sensing means being carried on the lower front corner thereof with the disk immediately therebehind fastened to the lower rear corner.

7. The beet harvester as set forth in claim 1 in which: the drive train includes a gear reducer having input and output shafts at each drive wheel, the output shaft forming the driving connection to the drive wheel, the input shaft being offset upwardly above the output shaft and operatively coupled into the transmission to form a driving connection therebetween displaced a substantial distance above the axis of rotation of the drive wheels defined by the output shafts.

8. The beet harvester as set forth in claim 7 in which: the transmission includes a pair of output shafts in axial alignment with one another but projecting in opposite directions toward the drive wheels, said transmission output shafts being offset upwardly above the input shafts of the gear reducers, and universal-jointed intermediate shafts forming a driving connection between the transmission output shafts and the gear reducer input shafts.

9. The beet harvester as set forth in claim 1 in which: the beet-releasing means comprises a paddle-type wheel journalled for rotation about a transverse axis lying between the upper and lower decks, said paddle-type wheel having a plurality of radial vanes rotatable into position between the digger elements of the beet-digging means, and means forming a driving connection between the prime mover and paddle-type wheel adapted to rotate the latter in a direction to dislodge the beets from between the digger elements and deposit same on the cleaning and conveying means.

10. The beet harvester as set forth in claim 1 in which: a second elevator means is positioned in the bottom of the hopper extending upward laterally therefrom over the side, said second elevator being adapted to discharge beets from the hopper into a second vehicle travelling alongside.

11. The beet harvester as set forth in claim 10 in which: the second elevator means is located in the forward end of the hopper; the conveyor means has its forward extremity terminating short of second elevating means; and, second conveyor means is located in the bottom of the hopper beneath the discharge end of the first conveyor means, said second conveyor means terminating at the side of the second elevator means and functioning to load same from the bottom of the hopper.

12. The beet harvester as set forth in claim 10 in which: the first elevating means includes an endless belt having longitudinally-spaced transversely-extending upstanding partitions adapted to hold the beets against said belt while being elevated.

13. The beet harvester as set forth in claim 1 in which: the transverse rotating elements of the beet-cleaning and conveying means comprise a plurality of transverse shafts journalled for rotation between the sides of the hinged frame, a plurality of star wheels mounted on each shaft in staggered overlapping relation to the wheels on adjacent shafts, and means operatively interconnecting the several shafts for simultaneous rotation in the same direction.

14. The beet harvester as set forth in claim 13 in which: power transfer means operatively interconnects one of said transverse shafts to the prime mover, said power transfer means turning said shaft in a direction to carry the beets from the front toward the rear of said cleaning and conveying means.

15. The beet harvester as set forth in claim 1 in which: topper retracting means are carried by the frame and operatively connected to the beet-topping means, said retracting means being adapted upon actuation to raise said beet-topping means upwardly into an inoperative position.

16. The beet harvester as set forth in claim 1 in which: digger retracting means are carried by the frame and operatively connected to the forward end of the hinged frame; said retracting means being adapted upon actuation to elevate the front end of the hinged frame raising the beet-digging means together with the beet cleaning and conveying means into an inoperative position.

17. A self-propelled vehicle for harvesting sugar beets and the like which comprises: a double-decked frame having one deck superimposed above the other, the lower of said decks having fixed side rails joined together at their forward ends by a transverse element to define an open area therebetween, means interconnecting the front ends of the upper and lower decks merging same into an intermediate deck projecting forwardly therefrom, an inverted generally U-shaped element interconnecting the side rails of the lower deck to the upper deck so as to leave the rear end of said lower deck relatively unobstructed, and horizontal elements projecting outward laterally in transversely aligned relation from the lower ends of the inverted U-shaped element; a pair of steerable wheels mounted on the forward end of the intermediate deck in transversely aligned relation on opposite sides of the frame; steering means operatively coupled to the steerable wheels; a pair of drive wheels journalled for rotation on the remote extremities of the aligned horizontal elements projecting laterally from the rear end of the lower deck; a prime mover mounted on the frame in position to leave the space between the upper and lower decks unobstructed; first power transfer means operatively coupling the prime mover to the drive wheels; a pair of beet-topping assemblies suspended from the intermediate deck between the steerable wheels and ahead of the lower deck, said assemblies each including vertically-adjustable movement about a transverse axis located along the rear edge thereof; a pair of beet-digger assemblies disposed in side-by-side relation in the forward end of the hinged frame aligned behind the beet-topping assemblies, said digger assemblies each including a set of two spoked disks independently mounted for rotation on opposed oppositely-inclined stub shafts mounted for limited rotational movement such that the point of closest approach of the disks mounted thereon can be varied along an arcuate path beginning at a position substantially in a direct line beneath said shafts through a succession of positions ranging rearwardly and upwardly therefrom to a final position behind said shafts, said disks upon release of the hinged frame into lowered position being adapted to enter the ground and roll along wedging a beet in the forwardly-facing V-shaped opening therebetween until said beet has been lifted free; a pair of kicker assemblies mounted for rotation about a horizontal transverse axis beneath the upper deck, each of said kicker assemblies including a paddle-type wheel with radial vanes projecting into the space between the set of digger disks; third power transfer means operatively connecting the prime mover and kicker assemblies adapted to rotate the latter in the direction to dislodge the beets wedged between the digger disks and propel same rearwardly; beet cleaning and conveying means located on the hinged frame behind the digger disks in position to receive the beets ejected from therebetween by the kicker assemblies; said means including a series of transverse shafts mounted for rotation in spaced parallel relation, a plurality of elements mounted on each shaft for rotation therewith adapted to tumble the beets deposited thereon so as to dislodge debris clinging thereto while simultaneously advancing same toward the rear end of the hinged frame, and means operatively interlocking the several shafts for simultaneous rotation in the same direction; fourth power transfer means operatively interconnecting the prime mover and one of the beet-cleaning assembly shafts adapted to turn said shafts in the direction required to convey the beets rearwardly on the hinged tray; first elevator means located at the rear end of the lower deck in position to receive the beets from the cleaning assembly and convey same upwardly; fifth power transfer means operatively interconnecting the first elevator means and the prime mover; an open-bottomed hopper supported on the upper deck; second elevator means mounted within the hopper in position to receive beets from the bottom thereof and convey same laterally to a point of discharge from the harvester; and, sixth power transfer means operatively interconnecting the prime mover and the second elevator means.

18. The beet harvester as set forth in claim 17 in which: the second elevator means is spaced forwardly of the discharge end of the first elevator means; horizontal conveyor means positioned atop the hopper with the intake end thereof located to receive beets from the discharge end of the first elevator means and carry same forwardly to a point of discharge above the second elevator means; and, means operatively connecting the horizontal conveyor means and the fifth power transfer means.

19. The beet harvester as set forth in claim 18 in which: the second elevator means is located in the forward end of the hopper bottom; second horizontal conveyor means is positioned in the bottom of the hopper behind the first elevator means and under the discharge end of the first horizontal conveyor means; and seventh power transfer means operatively connecting the prime mover and second horizontal conveyor means so as to run the latter in a direction to load beets from the bottom of the hopper onto the intake end of the second elevator means.

References Cited by the Examiner
UNITED STATES PATENTS

| | | | |
|---|---|---|---|
| 2,637,964 | 5/1953 | Orendorff | 171—133 X |
| 2,651,155 | 9/1953 | Orendorff | 171—133 X |
| 3,010,522 | 11/1961 | Oppel | 171—58 |
| 3,070,175 | 12/1962 | McCollum | 171—58 |
| 3,191,686 | 6/1965 | Everett et al. | 171—58 |

ABRAHAM G. STONE, *Primary Examiner.*

ANTONIO F. GUIDA, *Examiner.*